US007383550B2

(12) United States Patent
Challenger et al.

(10) Patent No.: US 7,383,550 B2
(45) Date of Patent: Jun. 3, 2008

(54) TOPOLOGY AWARE GRID SERVICES SCHEDULER ARCHITECTURE

(75) Inventors: James Robert Harold Challenger, Garrison, NY (US); Marcos Novaes, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 893 days.

(21) Appl. No.: 10/328,255

(22) Filed: Dec. 23, 2002

(65) Prior Publication Data

US 2004/0123296 A1 Jun. 24, 2004

(51) Int. Cl.
*G06F 9/54* (2006.01)
*G06F 9/46* (2006.01)
*G06F 9/44* (2006.01)
*G06F 15/163* (2006.01)

(52) U.S. Cl. .................... 719/315; 719/316; 718/102; 718/104

(58) Field of Classification Search .............. 719/315, 719/316; 718/102, 104
See application file for complete search history.

(56) References Cited

U.S. PATENT DOCUMENTS

| | | | | |
|---|---|---|---|---|
| 6,112,225 | A * | 8/2000 | Kraft et al. ............... | 709/202 |
| 6,345,287 | B1 * | 2/2002 | Fong et al. ............... | 718/102 |
| 6,571,274 | B1 * | 5/2003 | Jacobs et al. ............. | 709/203 |
| 6,701,382 | B1 * | 3/2004 | Quirt et al. ............... | 719/316 |
| 7,093,004 | B2 * | 8/2006 | Bernardin et al. ......... | 709/219 |
| 2002/0019864 | A1 | 2/2002 | Mayer | |
| 2002/0095605 | A1 | 7/2002 | Royer et al. | |

FOREIGN PATENT DOCUMENTS

| | | |
|---|---|---|
| JP | 08-305671 | 11/1996 |
| JP | 2003-030173 | 1/2006 |

OTHER PUBLICATIONS

Karonis, Supinski, Foster, Gropp, Lusk, and Lacour, "A Multilevel Approach to Topology-Aware Collective Operations in Computational Grids," Jun. 2002, pp. 1-16.*
Foster, Kesselman, Nick and Tuecke, "Grid Services for Distributed System Integration," Jun. 2002, IEEE, pp. 37-46.*
Li et al., "Hierarchial Partitioning Techniques for Structured Adaptive Mesh Refinement (SAMR) Applications". IEEE Proceeding on Parallel Processing Workshops, 2002.

* cited by examiner

*Primary Examiner*—Li B Zhen
(74) *Attorney, Agent, or Firm*—Gibb & Rahman, LLC

(57) ABSTRACT

The invention provides a system/method of processing client requests over a computer network of hosts, that includes creating persistent containers in the hosts, creating objects in the containers, grouping the containers into grid container arrays, grouping objects within containers that are within a single grid container array into grid object arrays, creating one micro scheduler for each grid container array, dividing each of the client requests into a plurality of tasks, and assigning groups of the tasks to the microschedulers, wherein the microschedulers assign individual tasks to the objects. The invention assigns the microschedulers additional groups of tasks as the microschedulers return groups of completed tasks. The method can also include passing the client requests through gateways to multiple grid services schedulers.

8 Claims, 11 Drawing Sheets

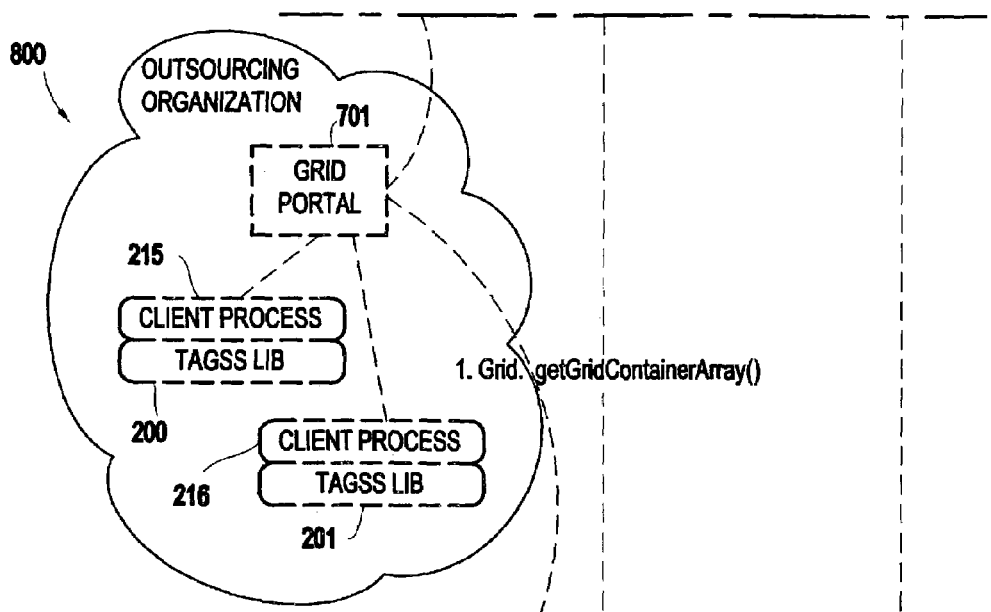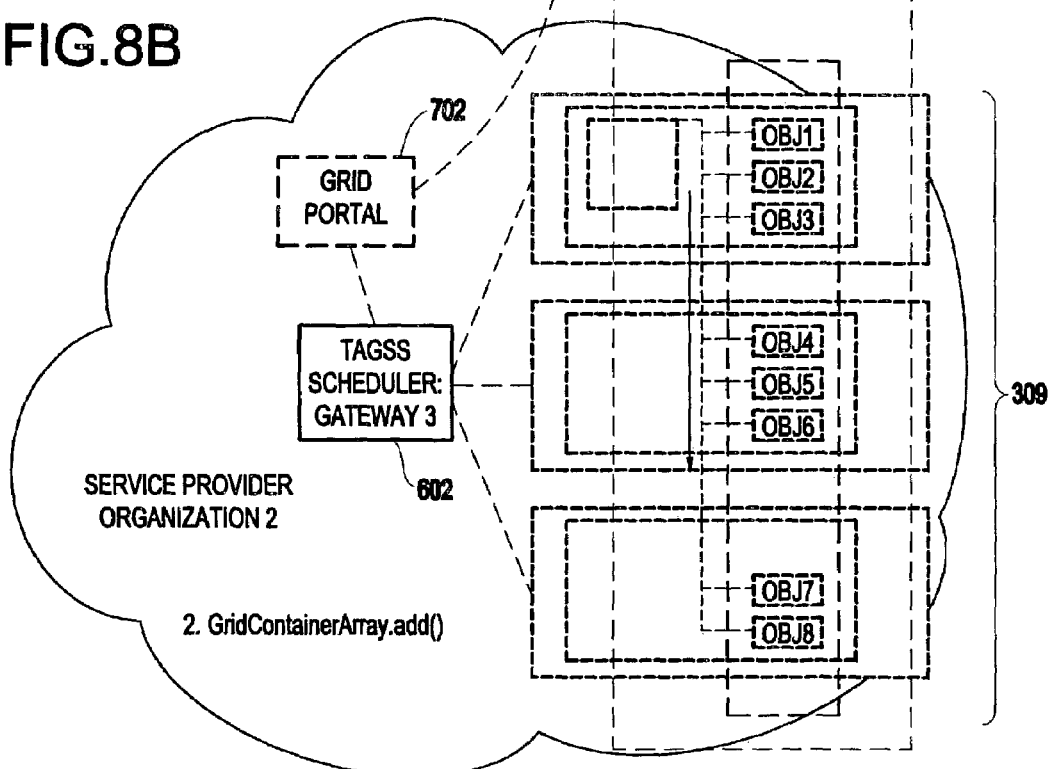

TOPOLOGY AWARE GRID SERVICES SCHEDULER ARCHITECTURE

BACKGROUND OF THE INVENTION

1. Field of the Invention

The present invention generally relates to processing requests over computer networks and more particularly to an improved system that uses a grid services scheduler to divide a client request into many tasks. The system executes the tasks through multiple objects within a grid object array, the objects are within containers that make up a grid container array, and the grid container array is controlled by a micro scheduler.

2. Description of the Related Art

It can be stated that Grid computing is a logical evolution of Cluster computing. The following examines this statement using the Globus toolkit (available from Argonne National Laboratory, located in Chicago, Ill., USA) as a point of reference for the implementation of Grid architecture. In considering the Globus toolkit, it should be pointed out that this technology is evolving at a very fast rate, and there are very significant differences at each release. In particular, the Globus 3.0 architecture is a huge leap, due to the fact that it is based on the Open Grid Services Architecture standard. Therefore, in discussing Globus it is necessary to state the exact release in order to set the context for discussion.

Consider the Globus 2.0 implementation, for example, which predates the introduction of the Open Grid Services Architecture (OGSA). In examining the Globus 2.0 architecture, it soon becomes clear that it defines the Grid as a "cluster of clusters". This compounded perspective has been expressed since the inception of the Globus program; the old term used for Grid computing was "Meta-computing"; a reference to the compounded nature of the multi cluster architecture. The "cluster of clusters" perspective is consistent with the initial objectives of the Globus program: to unite, in a single infrastructure, the several clusters located in the geographically disperse National Laboratories. This perspective also makes a lot of sense when considering the scalability of the Grid. Adding individual hosts to a Grid would soon result in an unmanageable infrastructure, and it is a logical step to group the hosts in separately managed groups. The "cluster of clusters" paradigm provides a two tiered hierarchy which greatly simplifies the administration of the Grid.

However, two limitations of the "cluster of clusters" paradigm became immediately apparent. The first is that this scheme was inherently two-tiered. That is, it could only support a two-tiered hierarchy, and it was necessary to make extensions to the original framework in order to support deeper hierarchies. The second limitation is that there was no central facility for scheduling tasks across the entire Grid; that is, there was no meta-scheduler. Each individual cluster was configured with a cluster scheduler which had the authority to schedule tasks in that cluster, but it soon became clear that a Grid scheduler (or meta-scheduler) was necessary to schedule tasks across the entire Grid. The main difficulty in the design of such a scheduler is that in the original Globus toolkit (versions 2.0 and lower) there is a discontinuity between the Grid world and the cluster scheduling world. In particular, different scheduling technologies and protocols were used for task scheduling within a cluster and among clusters. The invention described below proposes a unifying task scheduling domain for both the Grid and cluster domains, and it is therefore capable of seamlessly supporting very deep hierarchical Grids.

SUMMARY OF THE INVENTION

The invention provides a method of processing client requests over a computer network of hosts, that includes creating persistent containers in the hosts, creating objects in the containers, grouping the containers into grid container arrays, grouping objects within containers that are within a single grid container array into grid object arrays, creating one micro scheduler for each grid container array, dividing each of the client requests into a plurality of tasks, and assigning groups of the tasks to the microschedulers, wherein the microschedulers assign individual tasks to the objects. The invention assigns the microschedulers additional groups of tasks as the microschedulers return groups of completed tasks. The method can also include passing the client requests through gateways to multiple grid services schedulers.

The invention also provides a computer system for processing client requests. The system includes a grid services scheduler connected to grid container arrays. Each grid container array includes persistent containers (e.g., service containers), each of which resides in a different computer host, and a micro scheduler. Each container includes many objects. The objects within the containers that make up a single grid container array comprise a grid object array. The grid services scheduler transparently divides a client request into a plurality of tasks and assigns groups of the tasks to each microscheduler. Each of the microschedulers assigns individual tasks from a group of tasks received from the grid services scheduler to objects within their corresponding grid object array.

The system can include additional levels of scheduler hierarchy and include gateways, each connected to a different grid services scheduler. Portals are connected to the gateways, and the portals pass client requests along the gateways to the grid services schedulers.

Each container array resides in a local area network, such that communications between objects within a grid container array comprises local communications. The grid services schedulers divide the client request in a transparent manner such that a client is unaware of the dividing of the client request. The containers are persistent service containers and are used to process multiple client requests of multiple clients over a time period that spans multiple client requests.

BRIEF DESCRIPTION OF THE DRAWINGS

The invention will be better understood from the following detailed description of preferred embodiments with reference to the drawings, in which.

DETAILED DESCRIPTION OF PREFERRED EMBODIMENTS OF THE INVENTION

Figure 1:
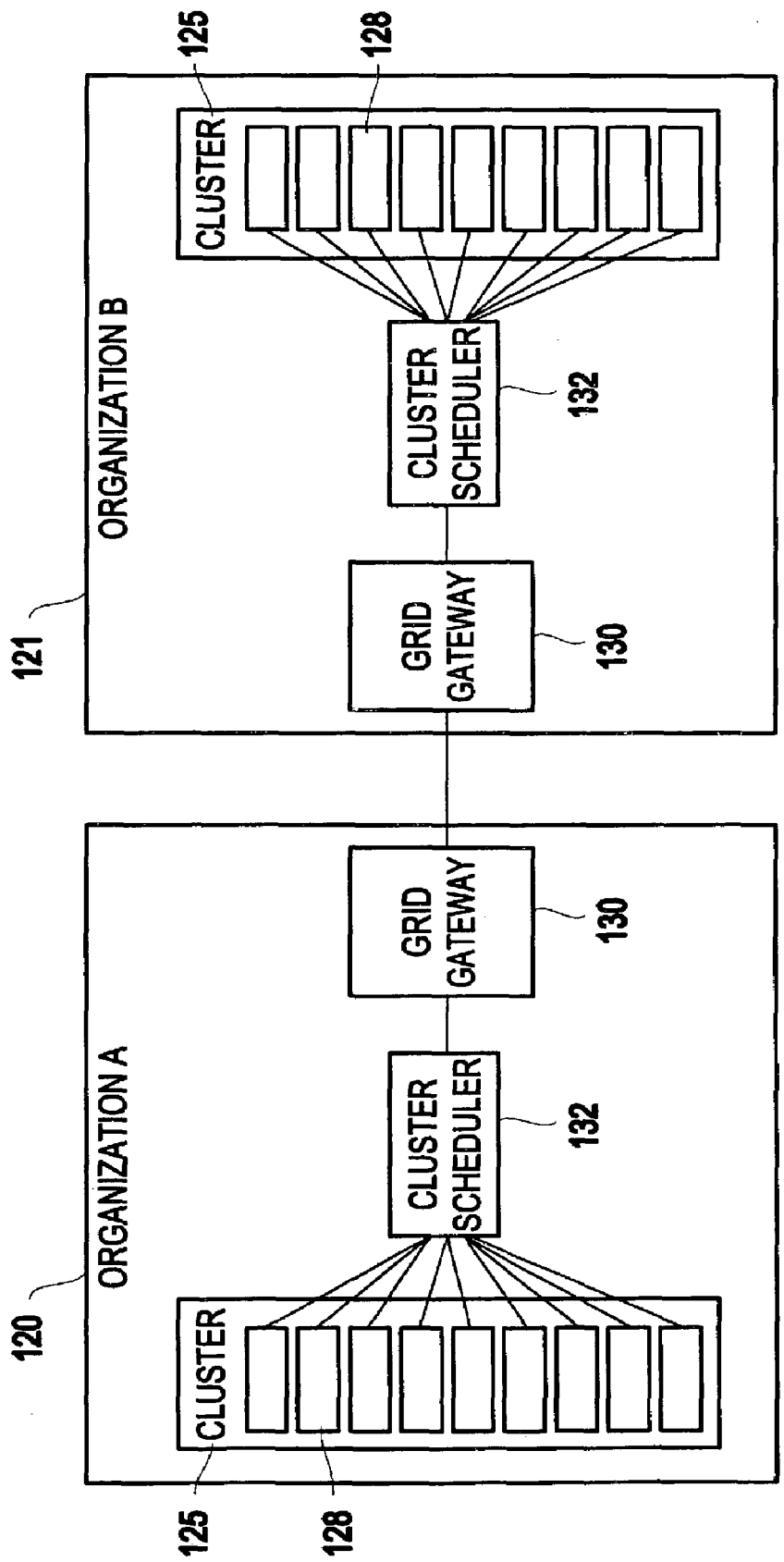
FIG. 1 is a schematic diagram of an architecture shared by two different organizations.

As mentioned above, different scheduling technologies and protocols were used for task scheduling within a cluster and among clusters. The inventive Topology Aware Grid Services Scheduler (TAGSS) scheduling architecture proposes a unifying task scheduling domain for both the Grid and cluster domains, that is capable of seamlessly supporting very deep hierarchical Grids.

This disclosure examines the challenges associated with the design of a meta scheduler for the Grid. In particular, we will discuss the differences between a cluster environment and a Grid environment, and we argument that traditional cluster scheduling architecture is not adequate for meta scheduling in a Grid environment. This statement is particularly true when we consider that the introduction of a services based architecture further distances the new Grid technology from traditional Cluster Computing. As we discuss these aspects, we introduce the inventive architecture of the Topology Aware Grid Services Scheduler (TAGSS), which was designed for a services oriented Grid architecture.

In this section we briefly explore the main differences between the Cluster and Grid environments which impact the design of the task scheduling infrastructure. With respect to Topology Considerations, the first consideration relates to the overall topology infrastructure. Typically, clusters have a uniform topology, i.e., the computing hosts are usually of the same type, in many cases identical, and usually all hosts are reachable through a common network. In some cases, the cluster may be equipped with a high speed network. Clearly, this environment is very different from the average Grid, because Grid resources may be reachable via a wide area network, and each resource will be reachable with different degrees of quality of service according to the characteristic of the wide area network links. The variation in network speed is one of the principal considerations in the design of TAGSS, as will become clear in the sections that follow.

With respect to services scheduling versus job scheduling, another important consideration to be made is in regard to the recent transition to a services based architecture, as proposed in the OGSA standard. The services based architecture differs considerably form the job based architecture used by most cluster schedulers. Here, we should carefully define what is meant by the term job. We use the terminology that has been used by most task scheduling middleware available for cluster computing, such as Condor (available from the University of Wisconsin-Madison, located in Madison, Wis., USA), PBS (available from Veridian Systems, located in Mountain View, Calif., USA), LSF (available from Platform Computing, located in Markham Ontario, Calif., USA) and Load Leveler (available from International Business Machines Corporation, located in Armonk, USA). All these schedulers are known as job schedulers. The following compares the characteristics of job and service schedulers.

With respect to job and job scheduling, a job is associated with one or more processes. When we say that a job is scheduled it is meant that one or more processes are created in target hosts. A job is described in terms of the parameters that are relevant to the creation of the processes that the job is associated with; such as: command line syntax, environment variables; and also according to the resources that it needs, such as number of CPUs or hosts, run time libraries and so forth. Another interesting aspect of a job is the data communication model, i.e., the way in which a job deals with input and output data. The input data is passed using arguments in the command line and also environment variables; in both cases the only supported format is text. That is, the input data is passed as text strings, which may of course refer to files which contain the input data proper. The output data is passed in a similar way; there may be text output available from the standard output pipe, but usually the output data is in the form of files. Therefore, a job is usually coupled with a set of input and output files, and for this reason most cluster schedulers implement a file staging function, which gives the ability to transfer files to remote hosts prior to the execution of a job, and upon the completion of a job retrieves the set of output files. This definition dictates that a job is related to a single unit of work, because it consists of a process which is initiated with a single set of input parameters (usually in behalf of a single user), and usually the job processes cease execution after the output is produced. For this reason, the processes associated with a job may be described as transient. The transient character of a job has limits its programming model to batch execution.

With respect to services, service requests and request scheduling, a service may be equally associated with one of more processes. However, the processes associated with a service are usually persistent. That is, a service does not cease execution after it performs a given task, rather it is a persistent application, much like a server, capable of executing multiple units of work, or service requests. Therefore, the request scheduling activity does not involve the creation of any new processes. Rather, request scheduling consists of queuing incoming service requests from several users according to some administrative policy, and the requests are then routed to the appropriate service instances which can better perform a given request. The persistent nature of a service provider also enables a real time programming model. As for the aspect of data handling, a service uses a much more flexible infrastructure, derived from standards such as WSDL and SOAP. The input and output parameters can be described as portable data objects which support several processor architectures.

The table below compares jobs to service requests according to the aspects discussed in the definitions above:

TABLE 1

| characteristics of jobs and service requests | | |
|---|---|---|
| aspect | job | service request |
| execution model | transient processes | persistent service provides |
| data handling | text parameters and files | structured data |
| programming model | batch processing | batch or real time processing |
| scheduling model | job scheduling | request scheduling |

Regarding the importance of the task scheduling granularity, before proceeding with the description of the TAGSS architecture we make one last remark concerning a major advantage of using finer grained service requests as opposed to jobs. Because the service request is a much smaller unit of work, it enables applications to outsource only a portion of the computing tasks. This feature allows most of the code and data of an application to be contained within a single host or organization. This feature is an important requirement in applications where the application code is of a proprietary nature, because the only small code segments need to be shipped to outsourcing organizations, and in the case of standard services outsourcing (such as basic mathematical routines) no code needs to be transported. Another important use of this feature is in the case that the application handles large amounts of data. In many cases it is possible for the application to manipulate the data manually and only transmit the data that strictly required for out sourced operations. This is an important consideration given the sensibility of that many applications have in regard to disclosing proprietary code. It is also an important consideration in respect to the efficiency that is gained in requiring only the transmission of essential data. FIG. 1 illustrates a cluster that is an application which runs mostly within a single organization, and only outsources small, parallelizable tasks. In FIG. 1, objects 128 are used to perform particular tasks. The objects 128 are contained within clusters 125. The two organizations 120, 121 process data through the clusters 125 by using a cluster scheduler 132 and a grid gateway 130. To the contrary, the invention provides a grid which utilizes an unlimited number of nodes within a number of different organizations. Having discussed the differences between Cluster and Grid computing, particularly pertaining to the aspect of topology and task scheduling, we have established the necessary background for discussing the architecture of the inventive Topology Aware Grid Services Scheduler (TAGSS).

The invention provides a Services Oriented Architecture. Thus, we begin with a discussion of a real time scheduling scenario, and the first consideration is to precisely define what is meant by real time scheduling. In the section above it was discussed that service providers can provide a real time programming, as opposed to batch execution. We define these terms in relation to the communication model of some client process.

A job request or service request is initiated by some client which executes a client process. In a batch programming model the client process exits after posting the job request. Also, in a batch programming model there are usually not active communication channels between the job and the client process. In a real time programming model, the client process can interact with the persistent service provider. The real time interaction is extremely important in considering the design of a service request scheduler. In particular, the real time interaction makes possible for a service to be stateful that is, the service can keep data related to the interaction of a given client. The capability of handling state had been recently added to Web services technology, and it is a main design point in OGSA.

In order to discuss the advantage of a stateful model, consider the advantages it brings to the programming model. Because it is possible to keep active state in the service provider, a client process has the ability of making a service request using as input a reference to the result of a previous request. We will refer to this feature as server side caching, and we will discuss how the TAGSS architecture implements this function as we introduce the TAGSS programming interfaces.

In order to introduce the TAGSS programming model, it is helpful to refer to the TAGSS Java programming interfaces. There are also bindings in native languages, such as C, but the Java API is preferable for this discussion due to the strong analogy between services and Java objects. In fact, it is possible to map Java object definitions to WSDL service descriptions using automated tools. In this section we disclose a framework for a services based definition.

With respect to container services, one of the objectives of the TAGSS architecture is to provide a simple real time programming model. In Java, objects are executed within a run time environment called a Java Virtual Machine, or JVM. In a service analogy, a service is executed in a container. The TAGSS architecture follows this analogy, defining a Container Service. The Container Service provides services related to object creation and object method invocation. These concepts are associated with service instantiation and service request handling.

The invention provides container service factories. One of the major aspects which defines a service is the way in which it is created and destroyed. In OGSA, service instances are created according to a specification implemented in a factory interface. The major issue in proposing a programming model for the Grid is how this interface is exercised. In order for a client process to post a service request it is necessary for it to bind with a service provider instance. Because the task of service creation needs to be made in conjunction of the observation of updated resource utilization measurements, the TAGSS architecture defines a resource monitoring service which plays a major role in the creation of Container Services. This resource monitoring service is named Scheduler Service. The Scheduler Service constantly monitors the resource utilization in a pool of nodes, and it controls the creation of Container Services in that pool of nodes.

The Scheduler Service does not create Container Services directly. In the TAGSS architecture, the Scheduling Service is implemented by the following process/system shown in FIG. 2. The TAGSS Scheduler 200, which is a central process, collects the resource utilization measurements in a pool of nodes 210 (or Minimal Scheduling Domain) and processes all requests for Container Services within this minimal scheduling domain. There is only one instance of a TAGSS Scheduler 200 process for a given minimal scheduling domain.

The TAGSS Agents 205 make periodical resource utilization measurements and reports these measurements to the TAGSS Scheduler 200 of its specific minimal scheduling domain. The TAGSS Agents 205 are also responsible for implementing the factory interface of Container Services. The Container Services may be dedicated for a given client, or they may be shared by several clients according to quality of service policies. These two possibilities are discussed in the scenarios below.

Figure 2:
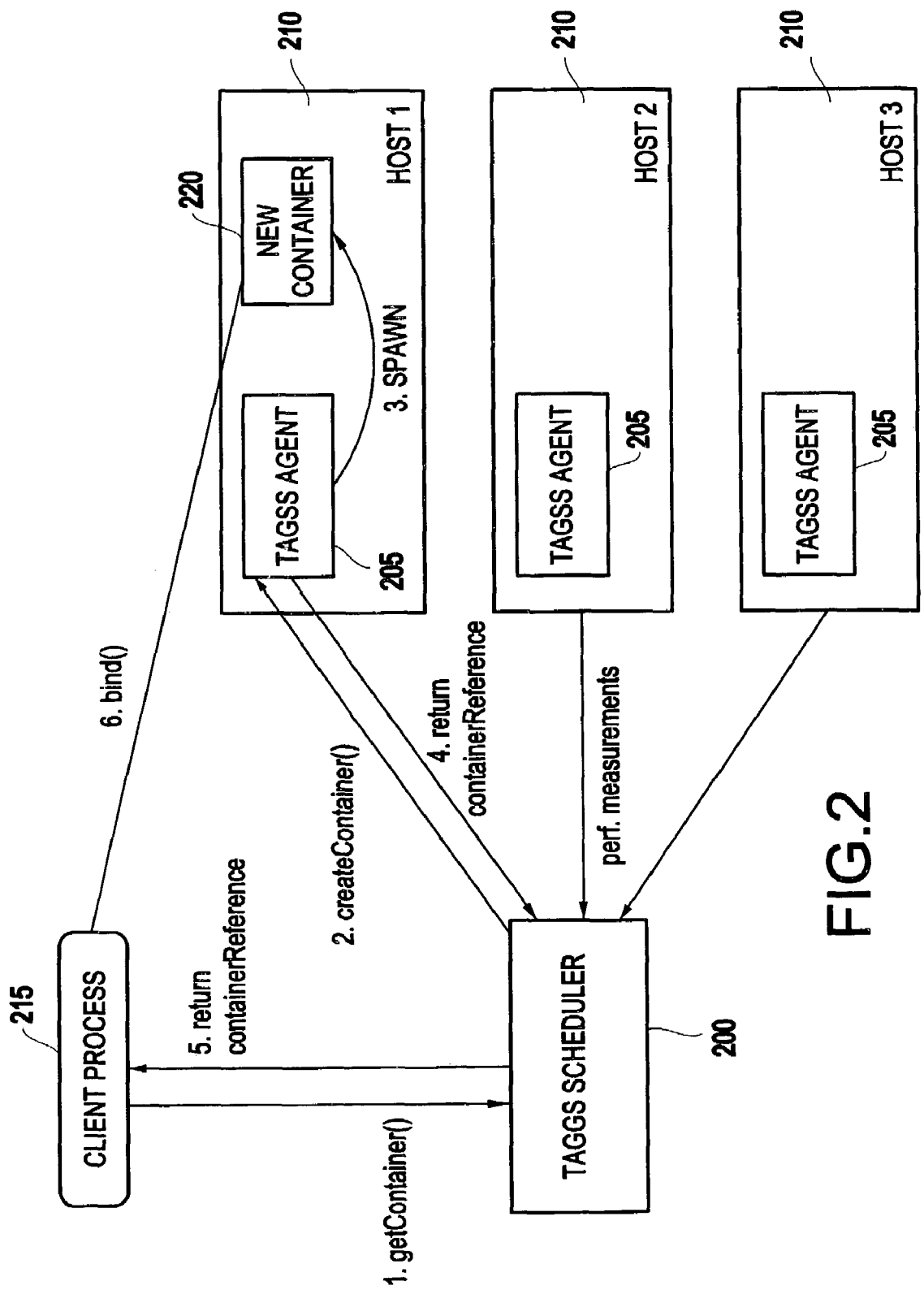
FIG. 2 is a schematic diagram illustrating the invention's ability to create containers on demand.

When binding to exclusive Container Services, FIG. 2 illustrates the message flow (1-6) showing how exclusive Container Services are created on demand in response to a client request. As shown in FIG. 2, the client process 215 first sends a request to the TAGSS scheduler 200 to get a container (1). Then, the TAGSS scheduler 200 sends an instruction (2) to the TAGSS agent 205 to create a container. The TAGSS agent 205 responds by spawning (3) a new container 220. The TAGSS agent 205 then returns the container reference (4) to the TAGSS scheduler 200. In turn, the TAGSS scheduler 200 returns the container reference (5) to the client process 215. The client process 215 than binds (6) to the new container 220. It can be noted that the client process 215 communicates directly only to the TAGSS Scheduler 200 and to the Container Service instance 220, and not to the TAGSS Agents 205. The existence of the TAGSS Agents 205 is transparent to the client processes 215 as they are an integral part of the Scheduler Services.

With respect to binding to shared Container Services, as mentioned above it is also possible for client processes to share containers. This approach has the advantage that it reduces the number of container processes created in each Grid host 210. It is possible to provide different levels of Quality of Service using shared containers which have different runtime execution priorities. The mapping of clients to specific containers would then be done according to administrative policy, or Service Level Agreement (SLA). However, the deployment of shared containers demands a comprehensive security infrastructure. The invention can use a framework similar to the one used in the Java Servlets environment to provide adequate security for shared containers.

Figure 3:
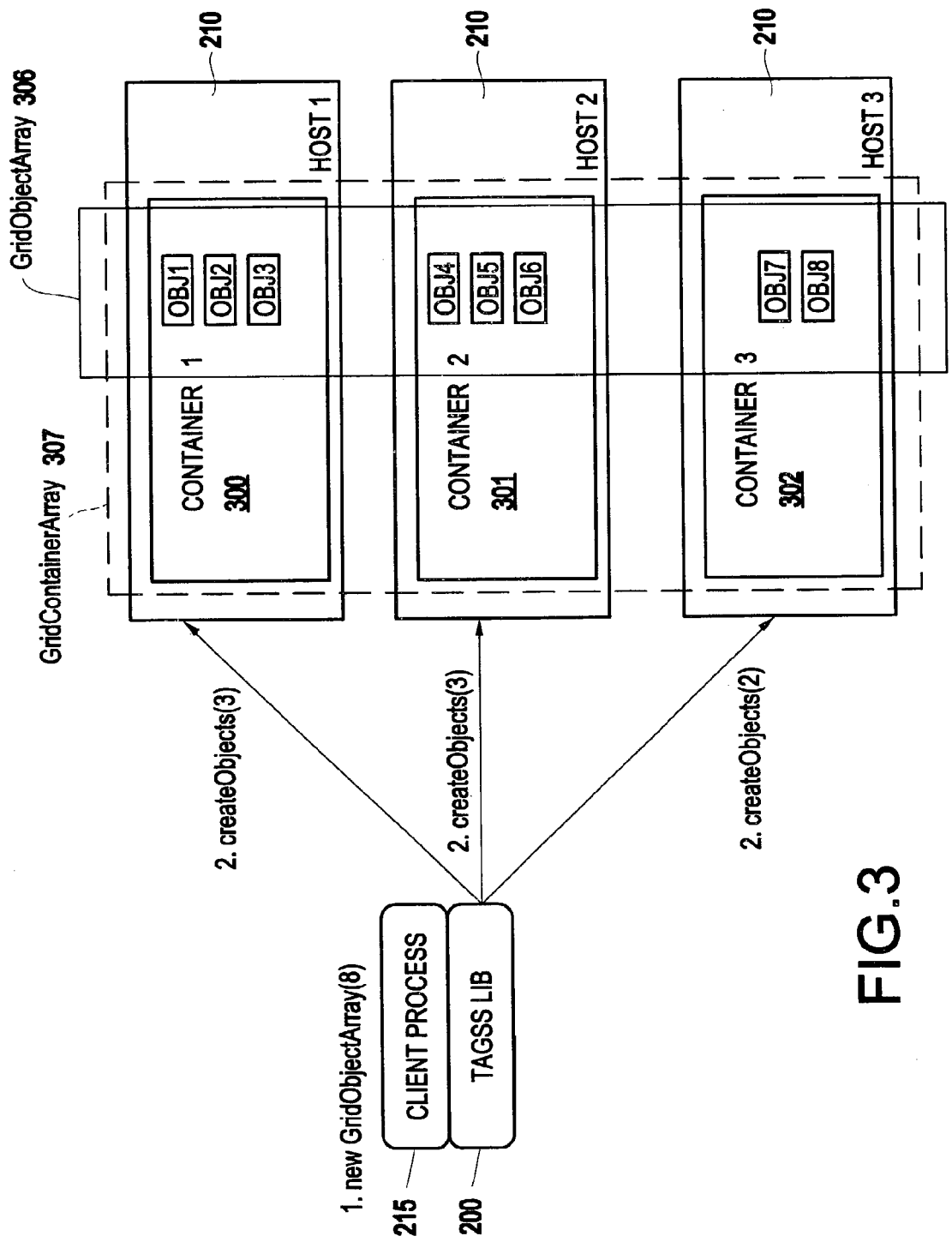
FIG. 3 is a schematic diagram illustrating that grid objects are created in various containers.

The following programming example illustrates the binding of a client process 215 to a Container Service 220. This explanation of the TAGSS API does not need to distinguish between shared and non-shared containers because the differences would be understood by one ordinarily skilled in the art given this disclosure. The following code segment illustrates how a client binds to a single Container Service (6). As shown in FIG. 3, the Scheduler Service 200 creates Grid objects (obj1-obj8). When a Grid object (obj1-obj8) is created, the client process 215 is bound to a given Scheduler Service 200. The network address and port number of the TAGSS Scheduler 200 process are passed as constructor arguments when the Gird object (obj1-obj8) is constructed. Once a Grid object (obj1-obj8) is created, the client process 215 can use it to bind to a number of Container Services 300-301, by executing the Grid.getContainer( ) method (1) in FIG. 2).

```
Grid myGrid = new Grid("tagss_scheduler_hostname", tagss_scheduler_port);
GridContainer myContainer = myGridContainer.getContainer( );
```

Code Segment 1: Connecting to a Grid Provider

With respect to creating an Object (obj1-obj8), once the client process 215 is bound to a Container Service 300-301, it is able to create other services. In the Java API, the services are represented by Java objects. The creation of a new object is done by invoking the GridContainer.createObject method( ). This method requires the full qualified name of the object to be created and the constructor parameters. As shown in FIG. 3, the GridObjectArray(8) instruction directs the TAGSS scheduler 200 to create 8 objects. Three objects (obj1-obj3; obj4-obj6) are created in each of containers 300 and 301, while two objects (obj7, obj8) are created in container 302. The constructor parameters are taken directly from the programming environment using a Java ArrayList. Internally, the TAGSS API will use the JAVA reflection classes in order to match the object sequence passed in the ArrayList to the appropriate constructor of the given method.

```
// construct a GridObject of type myObjectClass.
//The constructor has the signature (Integer, Double, String);
Integer arg1 = new Integer(123);
Double arg2 = new Double(1.23);
String arg3 = "hello"
ArrayList args = new ArrayList( );
args.add(arg1);
args.add(arg2);
args.add(arg3);
GridObject myObject =
myContainer.createObject("myObjectClass",args);
```

Code Segment 2: Creating a Grid Object

The resulting GridObject can be cast into any user defined class type.

With respect to invoking a method in GridObject, the steps required to execute a method in a GridObject are similar to those of object creation. The method name is passed as a String and the arguments are passed using an ArrayList:

```
// assume that myObject was built as in Code Segment 2
//Prepare to invoke a method with the signature (int, real, String);
Integer arg1 = new Integer(123);
Double arg2 = new Double(1.23);
String arg3 = "hello"
ArrayList args = new ArrayList( );
args.add(arg1);
args.add(arg2);
args.add(arg3);
MyReturnObjectClass myResult = (MyReturnObjectClass)
myObject.invoke("myMethod",args);
```

Code Segment 3: Invoking a Method on a Grid Object

Again, the method signature is matched to the appropriate method using Java reflection. The result of the method invocation is returned as a new GridObject. The return value may be cast to the expected type of the method invocation. Currently, it is not possible to use parameter variables for returning results.

With respect to server side caching, the TAGSS API offers a variant of the GridObject.invoke( ) method which implements the server side caching feature previously discussed. The GridObject.invokeKeep( ) returns only a reference to the result of the method invocation, while the result themselves are kept in the Container where the method was invoked. The results can be retrieved at a later time using the GridObject.getValue( ) method. The following example shows how an application can concatenate calls to the GridObject.invokeKeep( ) method in order to minimize the amount of data that has to be transferred between the client and the service provider. In the example below, an image enhancing application applies a sequence of three filters to an image and retrieves only the final result. No intermediate result is ever returned to the client process, saving an entire roundtrip of the intermediary results. This technique is important for applications which manipulate bulky data, such as image processing.

```
// construct a GridObject of type myObjectClass.
//The constructor has the signature (Integer, Double, String);
Integer arg1 = new Integer(123);
Double arg2 = new Double(1.23);
String arg3 = "hello"
ArrayList args = new ArrayList( );
args.add(arg1);
args.add(arg2);
args.add(arg3);
GridObject myObject =
myContainer.createObject("myObjectClass",args);
```

Code Segment 4: Using Persistent State in Grid Objects

Again, note that the return value can be cast to any user defined class type.

With respect to higher level constructs, the basic primitives described above provide a very flexible interface to manipulate individual objects in a Grid environment. However, most Grid applications demand higher level constructs for the execution of parallelizable tasks. The TAGSS programming interface provides a set of higher level primitives for parallel operations. In one exemplary embodiment, the invention provides three higher level operations: message multicast, barrier enforced method invocation and scatter/gather operations. These functions are provided by the additional primitives in TAGSS which manipulate object collections described below.

A Grid Container Array 307 represents a collection of Containers 300-302. The Container Array implements the same function set as the Container, and methods invoked in a Container Array are applied to each container that is part of the Container Array. The Container Array factory interface is also implemented by the Service Scheduler, which is represented by the Grid object (obj1-obj8). The method that constructs Container Arrays is Grid.getContainerArray( ). This method takes as argument an integer denoting the number of Containers desired. The number of actual Containers returned may be less then the desired number, in case of a resource shortage. The actual number of Containers returned can be obtained by invoking GridContainerArray.getNumberContainers( ). If the value 0 (zero) is passed as the desired number of Containers argument, than the Grid Scheduler will return as many containers as are available, according to the resource utilization status and also according to the client's credentials. The example below shows illustrates the ContainerArray constructor syntax:

```
GridContainerArray myContainerArray = Grid.getContainerArray(0);
int numberOfContainers = myContainerArray.getNumberContainers
```

Code Segment 5: Creating a Grid Container Array

As previously mentioned, the Container Array 307 implements a function set similar to individual Containers. Just as a Container is a factory which creates a Grid object (obj1-obj8), the Grid Container Array 307 is a factory of objects of type Grid Object Array 306. The method which creates a Grid Object Array 306 is GridContainerArray.createObject( ). This method takes as input arguments the name of the object types to be created (class names) and also a data structure which contains the arguments for each constructor call to be invoked. The argument lists should have identical signatures, that is, each object indexed with the same value in the argument sequences should be of the same class type. In order to facilitate the construction of the argument list for creating an Object Array, the TAGSS interface uses an auxiliary data structure called a GridDataSet. The GridDataSet can be visualized as a matrix where each row is an argument list to be applied to a constructor or method invocation in an Object Array. Each column of the GridDataSet should therefore contain objects of the same data type. For example, the following illustration shows how to build a GridDataSet for invoking a constructor of signature Integer, Double, String:

```
// assume that the input values are in intArray, doubleArray, and
StringArray
GridDataSet myGridDataSet = new GridDataSet( );
ArrayList singleRow = new ArrayList( );
```

-continued

```
for(i = 0; i < inputSize; i++)
{
    singleRow.add(intArray[i]);
    singleRow.add(doubleArray[i]);
    singleRow.add( StringArray[i]);
    myGridDataSet.addRow( singleRow );
    singleRow.clear( )
{
```

Code Segment 6: Creating a Grid Data Set

It is important to note that the number of rows in the GridDataSet does not need to be the same as the number of Containers. The invention builds objects in just a subset of containers, and builds more objects than the number of containers by creating more than one object instance in a Container, as shown in FIG. 3. More specifically, FIG. 3 shows a client which tries to create a GridObjectArray with 8 objects, where only 3 containers are available. The client still succeeds in creating a Grid Object Array 306 with 8 objects by creating multiple objects in the available containers.

When executing a method in an Object Array 306, the Object Array 306 has a semantic similar to the Container Array 307. A method invocation directed at an Object Array 306 results in method invocation in each object instance of the Object Array 306. The result of this multiple method invocation is returned in a GridObjectArray, where the ith element is the result of a method invocation using the ith row of the GridDataSet. The following code segment illustrates the invocation of a method on a GridObjectArray:

```
// create a Grid Object Array
GridObjectArray myGridObjectArray =
GridContainerArray.createObject( myGridDataSet);
// assume that we loaded the input data in inputSet
GridDataSet inputSet = loadDataSet( );
// invoke a method on a Grid array
GridObject[ ] resultArray =
myGridObjectArray.invoke( "methodName",inputSet, invokation_mode);
```

Code Segment 7: Invoking a Method on a Grid Object Array

Three modes of method invocation in a Grid Object Array 306, which are specified using the argument TAGSSInvocationMode, described below:

The first mode is TAGSS_INVOKE_MULTICAST. This model of invocation is used with a single parameter list, and not a Grid Data Set as the two other modes below. In this invocation mode, a method is invoked in all objects of the Grid Object Array 306 with exactly the same set of parameters, contained in the single parameter list. This mode of invocation is used to send synchronization messages to objects.

Another mode is the TAGSS_INVOKE_EACH. This invocation mode specifies that each row in the GridDataSet should be applied to a corresponding object in the array. That is, row 0 is applied to object 0, row 1 to object 1 and so forth. This mode requires that the number of rows specified in the GridDataSet be equal or smaller than the number of Object in the array. This method invocation mode is used for barrier enforced method invocation.

Yet another mode is the TAGSS_INVOKE_ANY. This invocation mode denotes that there is no specific mapping requirement between rows of the GridDataSet to object in the Grid Object Array 306. This mode gives a great flexibility for the underlying scheduling infrastructure. For example it is possible to tell a Object Array with 10 objects to invoke a method on a GridDataSet of 1,000 rows. The mapping of which objects will work on which row is made at runtime by the underlying scheduling infrastructure in TAGSS, as described below. This method of invocation is used in the scatter/gather programming model. The three modes of invocation described above implement the three basic parallel programming models implement in TAGSS: message multicast, barrier enforced method invocation and Scatter/Gather. These three programming models are discussed in greater detail below.

The Message Multicast mode is a programming model that simply sends a single message to a collection of objects. The TAGSS API support this model by providing a method invocation function that takes a single argument list and applies it to all the objects in Grid Object Array 306:

```
GridObject[] result = myObjectArray.invoke("methodName",argList,
                     TAGSS_INVOKE_MULTICAST);
```

Code Segment 8: Using the Message Multicast Programming Model

Figure 4:
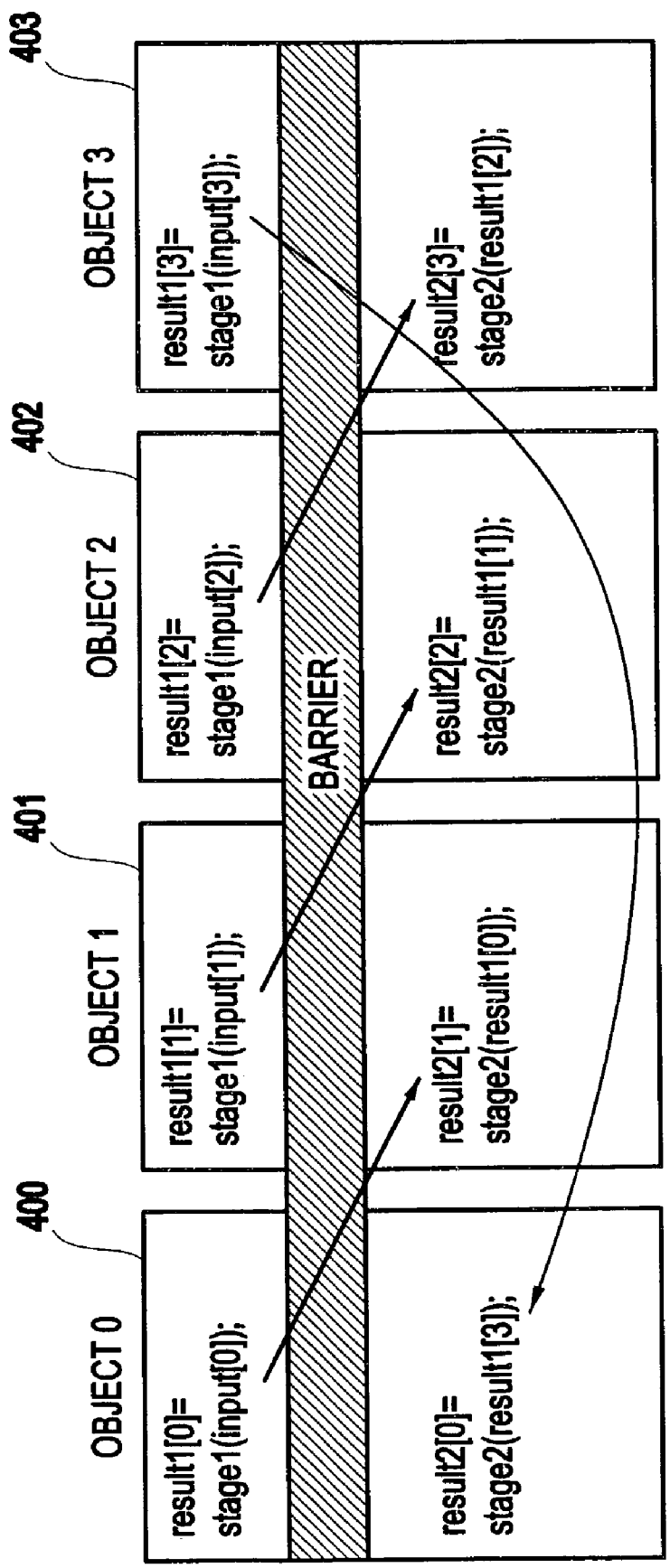
FIG. 4 is a schematic diagram showing the interactions between different objects.

The Barrier Enforced Parallel Method Invocation is a programming model that can be used to implement several parallel programming methods which require multiple objects to work on data in lockstep. A lockstep operation between objects 400-403 is illustrated in FIG. 4. In such a invocation, the objects all have to complete a certain method before the next method can be invoked, i.e., there is an implicit barrier which synchronizes the execution of each method. For example, the following code segment implements a pipeline which redirects the result of previous calculations to each object in the array in a shiftcarry fashion, using barrier synchronization to ensure that the results are complete before each method invocation:

```
// barrier synchronization example
//assume the input is already loaded in GridDataSet
// invoke 3 methods using a result pipeline that shifts to the right
GridObject[ ] result = myGridObjectArray.invoke( "first_stage",
           inputDataSet, TAGSS_INVOKE_EACH);
// shift the result to the right
GridObject temp = result[result.size( ); // keep the last element to wrap
around
for(i = 0;i<result.size( )-1;i++)
    result[i+1]=result[i];
result[0]=temp; // wrap around
// now call the second stage
GridObject result2 = myGridObjectArray.invoke("second_stage",
           inputDataSet, TAGSS_INVOKE_EACH);
```

Code Segment 9: Implementing a Shift-result-barrier Pattern

For example, executing the code above on four objects would have established the communication pattern in FIG. 4.

Figure 5:
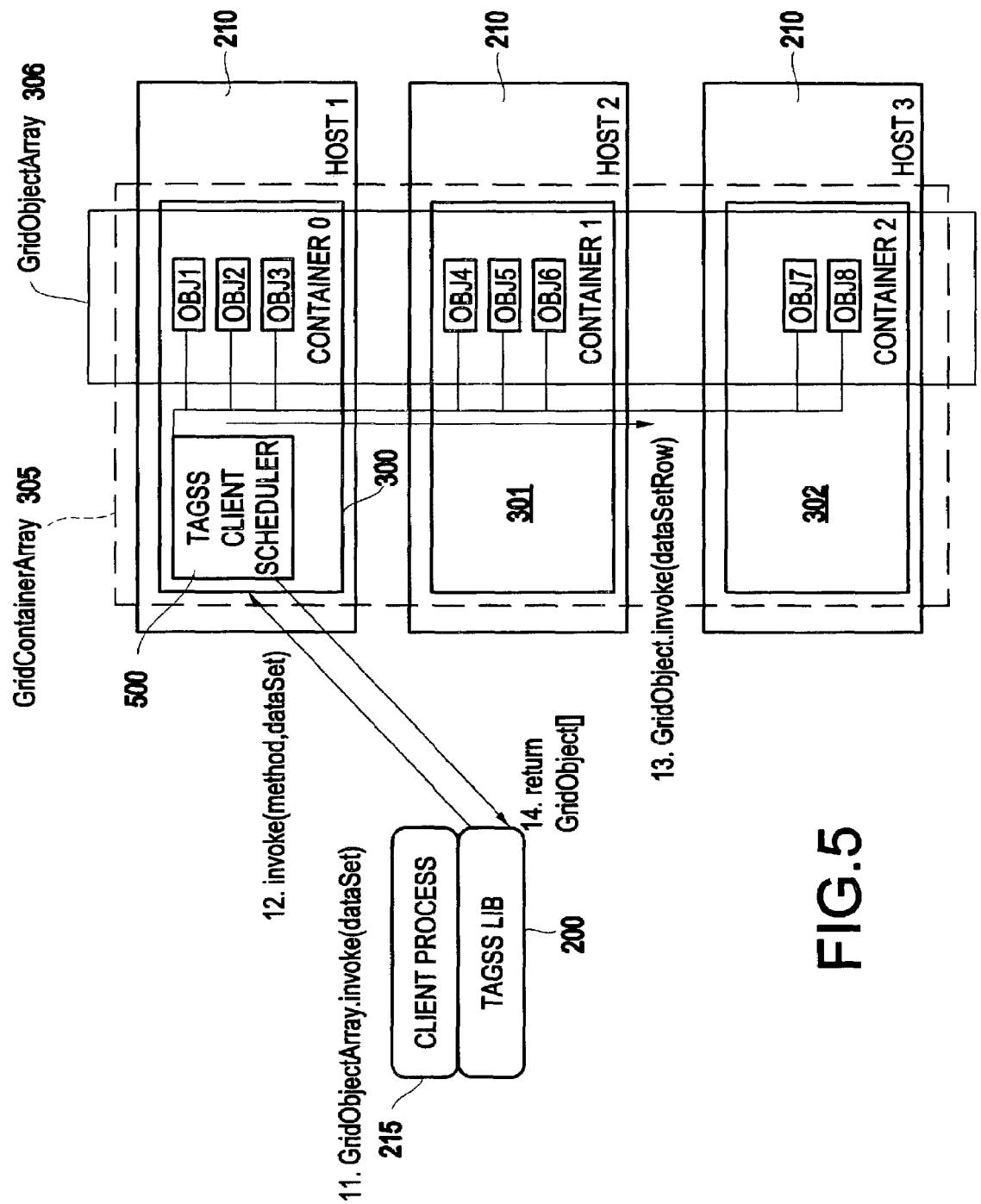
FIG. 5 is a schematic diagram illustrating how the invention forwards tasks to objects in the grid object array.

The Scatter/Gather model is used when the TAGSS_INVOKE_ANY invocation mode is specified. In this case the rows of the GridDataSet are assigned to any Grid object, according to run time conditions. The mapping of rows is done according to the capability of each object to complete method invocations. The run time scheduling is done by a built in scheduling agent created at run time in behalf of the client application, named TAGSS Client Scheduler (or microscheduler) 500 as shown in FIG. 5.

The microscheduler 500 is a small multi-threaded object which is implicitly built when a Grid Container Array 307 is constructed. Each Grid Container Array 307 has its own instance of the TAGSS Client Scheduler 500. The TAGSS microscheduler 500 scatters the rows among the objects (obj1-obj8) in the Grid Object Array 306, and then schedules new rows are tasks are completed by the objects (obj1-obj8). Therefore, as shown in FIG. 5, the client process 215 invokes the grid object array 306 with a data set (11). The TAGSS scheduler 200 invokes a specific method with the data set (12). The TAGSS micro scheduler 500 invokes the data set rows (13) to the various objects (obj1-obj8), each of which performs a specific task on one of the rows. Upon completion of the tasks by the objects, the TAGSS micro scheduler 500 returns the grid object (14).

The placement of the TAGSS Client Scheduler object is made in consideration of the overall TAGSS architecture, and it is made according to the Grid Topology, considering that the TAGSS microscheduler 500 generates a lot of network traffic and I/O processing. The Container 300 which runs the TAGSS Client Scheduler 500 is a central coordination point both in the message multicast and scatter/gather models. The TAGSS Microscheduler 500 is in communication with all objects (obj1-obj8) in the Object Array 306 and is constantly passing input data for method invocations as well as gathers output data upon completion.

These conditions indicate that the client process 215 is a poor choice for placement of the TAGSS microscheduler 500. That is so because the usual configuration in a Grid places the client processes 215 at the fringes of the network, connected via a network with much lower speed than the center of the network.

In order to select the best location for the TAGSS microscheduler 500, the TAGSS architecture positions the TAGSS microscheduler 500 in the containers that will provide the best performance (when compared to the other containers in that grid container array). The selection of the container is done according to the performance measurements (e.g., processing speed, input/output capacity and volume, etc.) available at the time that the Container Array 307 is created. By convention, the TAGSS Scheduler Service 200 orders (ranks) the containers in decreasing order of client of service, with the Container indexed by 0 (zero) being the best performing Container of the grid. When a Grid Container Array 307 is created, the TAGSS microscheduler 500 is created in the Container 0 (zero).

With respect to Batch Invocation, the run time scheduling process supports batched invocation. That is, when a client wishes to exit after posting a large parallel request, the TAGSS architecture provides for that functionality by implementing an asynchronous invocation option, made available by the GridObject.invokeAsync( ) method. This method returns a request reference, the GridBatch, which is a persistent reference to a GridObject. A client process can save this reference in persistent storage and then retrieve the GridObject at a later time. The client process can query for the completion of a GridBatch using the method GridBatch.peek( ), which returns true when the GridBatch is complete, at which time the result can be retrieved by invoking the GridBatch.getResult( ) method. Exemplary code for this processing is shown below.

```
// carry out three large operations in parallel, and then wait on all complete
GridBatch batch1 = gridObjectArray1.invokeAsync("method1", dataSet1);
GridBatch batch2 = gridObjectArray2.invokeAsync("method2", dataSet2);
GridBatch batch3 = gridObjectArray3.invokeAsync("method3",dataSet3);
// check if batch 1 is complete
Boolean isComplete = batch1.peek( );
// wait on batch 1 to be complete
GridObject[ ] result = batch.waitOnComplete( );
// wait on both batches 2 and 3 to complete
GridWaitCondition waitCondition= new GridWaitCondition( batch2 );
waitCondition.add( batch3);
waitCondition.waitOnComplete( );
```

Code Segment 11: Using Wait Conditions to Synchronize Parallel Invocations

The invention is applicable to both interactive and offline client processes. The programming paradigm described above is not limited to an interactive client process. A client request can be submitted offline. In this case, the code that executes the client process itself needs to be sent as a offline job request. The execution of the client process will then follow the job scheduling paradigm. Once the client process is scheduled and launched the real time session with the scheduling resources are established, and then the scheduling process works in real time just as previously described.

The TAGSS architecture also works well in a distributed environment. For best performance, the nodes with similar characteristics should be grouped in a Minimal Scheduling Domain controlled by a single Service Scheduler. The size of a Minimal Scheduling Domain will impact the performance of the nodes which run the TAGSS microscheduler 500.

The TAGSS architecture provides a simple way to spread tasks across multiple Minimal Scheduling Domains. As previously mentioned, the task scheduling is done by the TAGSS microscheduler 500, a small multi-threaded object that gets created in a distinguished Container in each Grid Container Array 307. In order to schedule across Minimal Scheduling Domains, a composite Grid Object Array 306 is built using multiple Grid Object Arrays. The scheduling task is then partitioned among the TAGSS Client Schedulers in each Grid Object Array 306.

This powerful feature is transparent to client processes. Just as the TAGSS microscheduler 500 objects were created implicitly by the TAGSS infrastructure, the division of the work load among multiple objects also happens implicitly, according to the semantics of object creation and method invocation described above.

In order to spread tasks among multiple objects, all a client application has to do is to build a composite Grid object. This is done by using the method Grid.add( ) as shown below. This method binds the Grid object to the TAGSS Scheduler 200 of another scheduling domain. For example, in the code shown below and in FIG. 6, a Grid object array 306 bound to "gateway1" 600 is created, and then it is also bound to "gateway2" 601 using the Grid.add( ) method. The second gateway 601 is connected to a grid container array 308 that is substantially similar to grid container array 307, discussed in detail above. Grid container array 308 utilizes different hosts 211 and contains a different but similar grid object array 307 made up of objects obj9-obj16 that are within containers 303-305. The hosts 211 could be geographically separate from hosts 210. However hosts 211 are preferably within a localizes network (e.g., one organization), while hoses 210 are similarly, within their own localized network. As mentioned above, each grid container array need its own TAGSS micro scheduler. Therefore, grid container array 308 includes TAGSS micro scheduler 501. Grid container array 307 and grid container array 308 make up a Composite Grid Container Array 608 which contains the maximum number of containers available at all of the gateways. FIG. 6 also illustrates the resulting composite grid object array 607 that is formed from grid object array 306 and grid object array 307. The composite grid container array 608 and the composite grid object array 607 span multiple domains (e.g., 210 and 211) that may have substantially different computing capabilities. Note that there is no difference in semantics or in the API of composite Grid Object Arrays, the fact that it spans more than a Minimal Scheduling Domain is transparent to the client process 215. The coding example shown below then makes a request for all containers in the Grid object, using the method Grid.getContainerArray( ) specifying 0 (zero) containers.

```
// connect to the Service Scheduler in 2 different domains
Grid grid1 = new Grid("gateway1",1234);
Grid1.add("gateway2",1234);
// build a large Container Array 307 using containers from
2 different domains
GridContainerArray bigContainerArray =
    grid1.getContainerArray(0);
// create an Object Array that spans 2 domains
GridObjectArray bigObjectArray =
    bigContainerArray.createObject("objectType",inputArgs);
// invoke a method on the object array
GridObjectArray bigResult =
    bigObjectArray.invoke("methodName",methodArgs);
```

Code Segment 12: Using Composite GridContainers

Figure 6A:
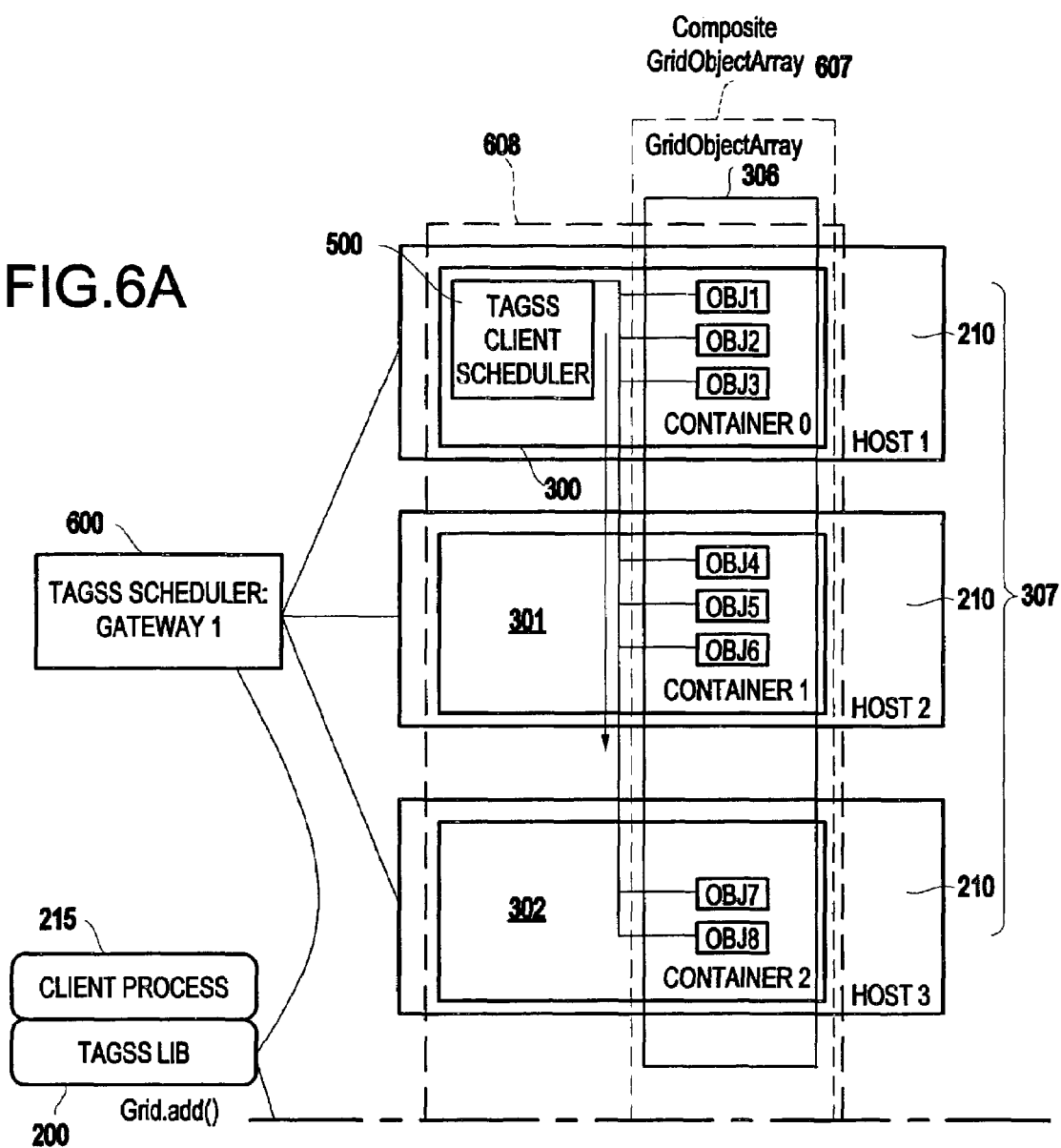
FIG. 6 is a schematic diagram illustrating multiple clients schedulers in a composite grid container.
Figure 6B:
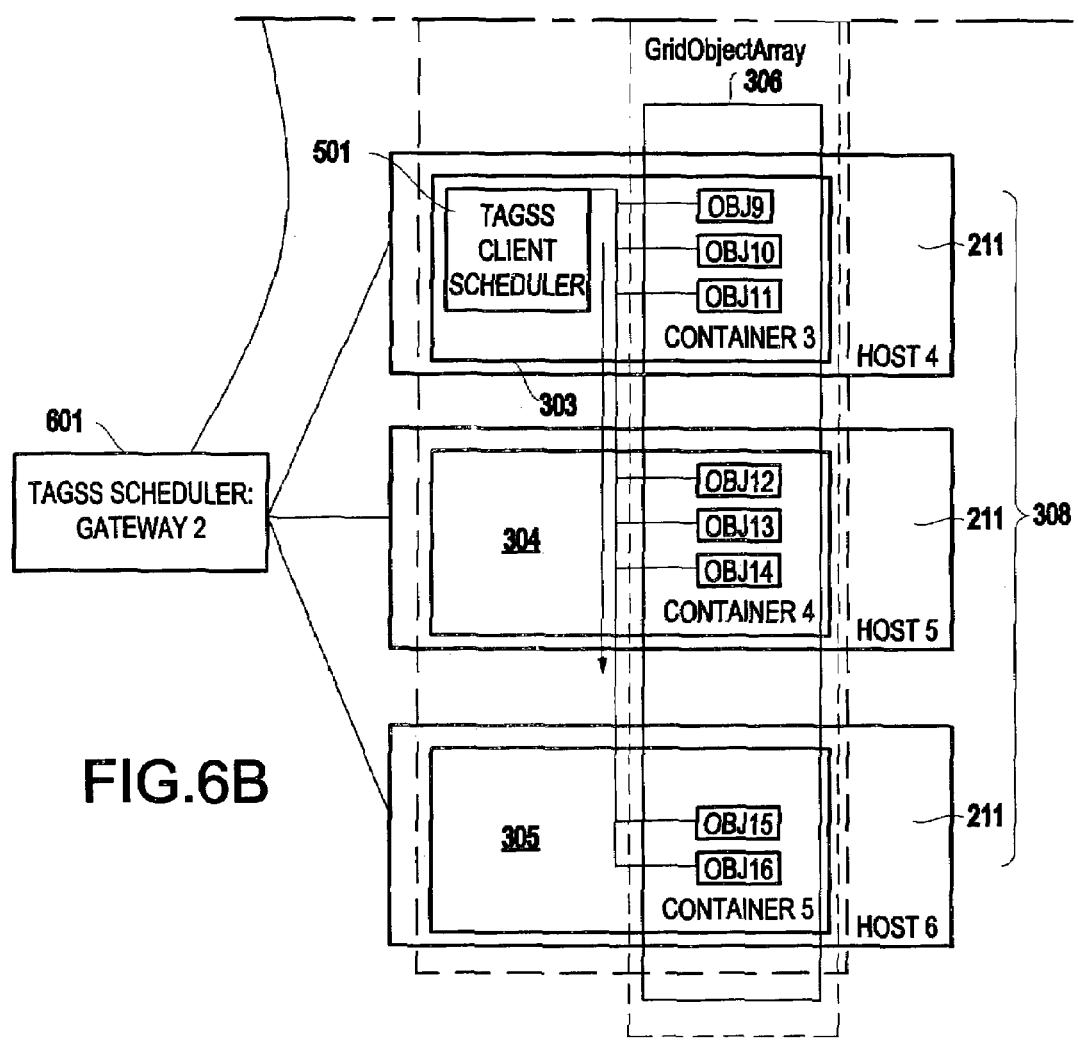
Figure 6C:
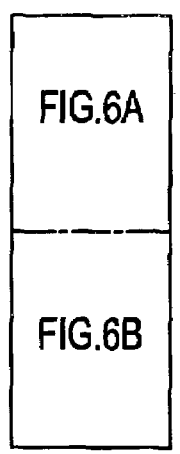
Figure 7A:
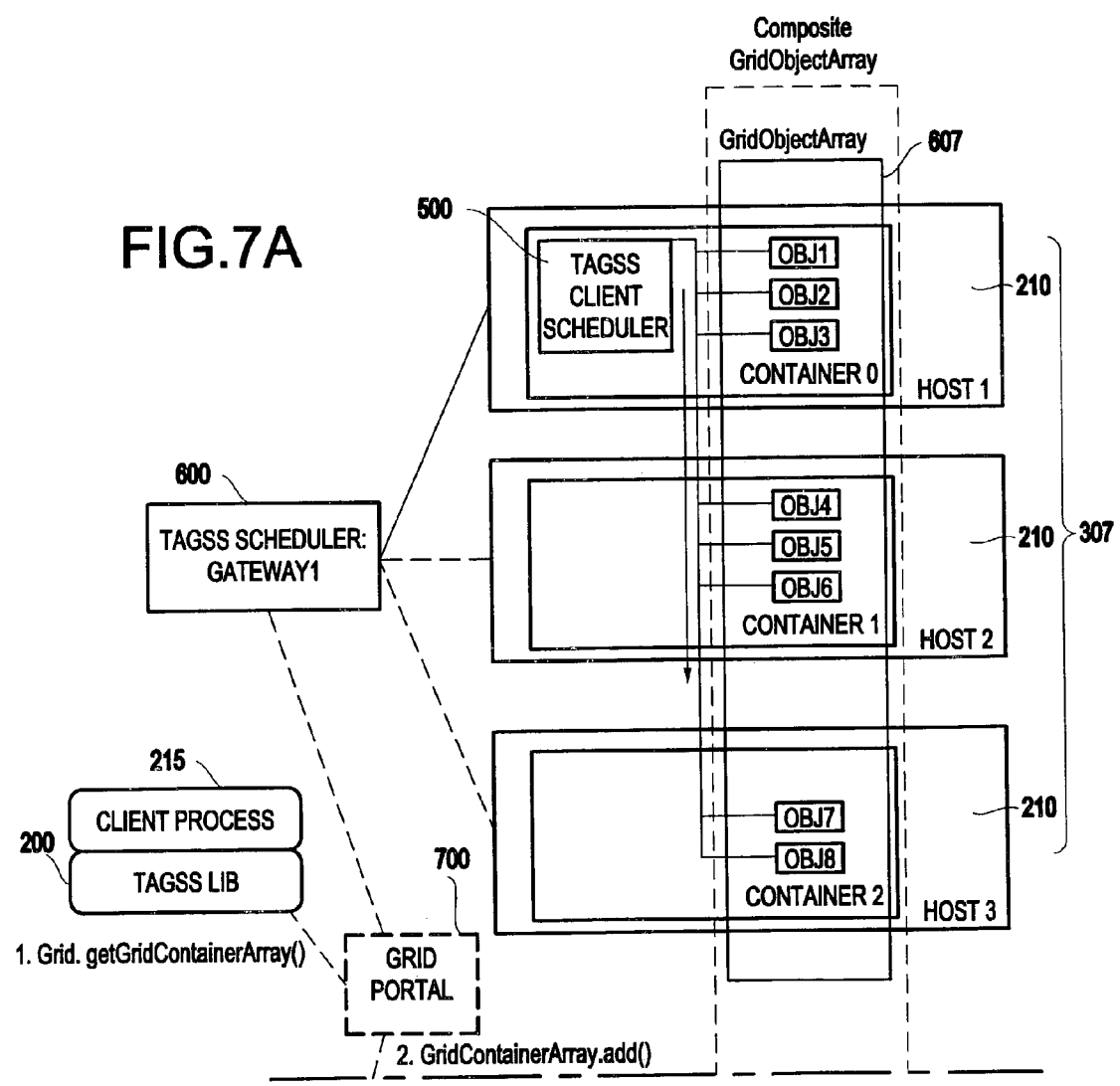
FIG. 7 is a schematic diagram illustrating hierarchal scheduling using a grid portal.
Figures 7A, 7B, 7C:
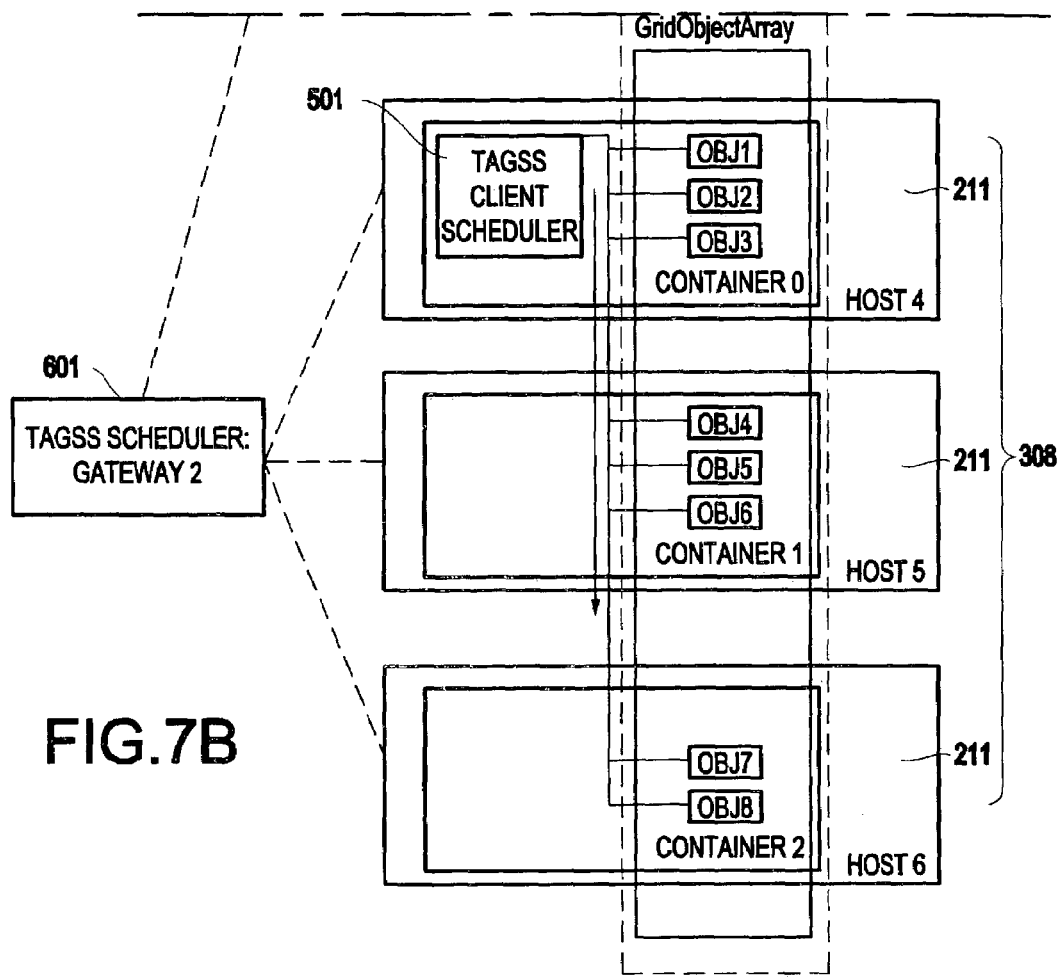
Figure 8A:
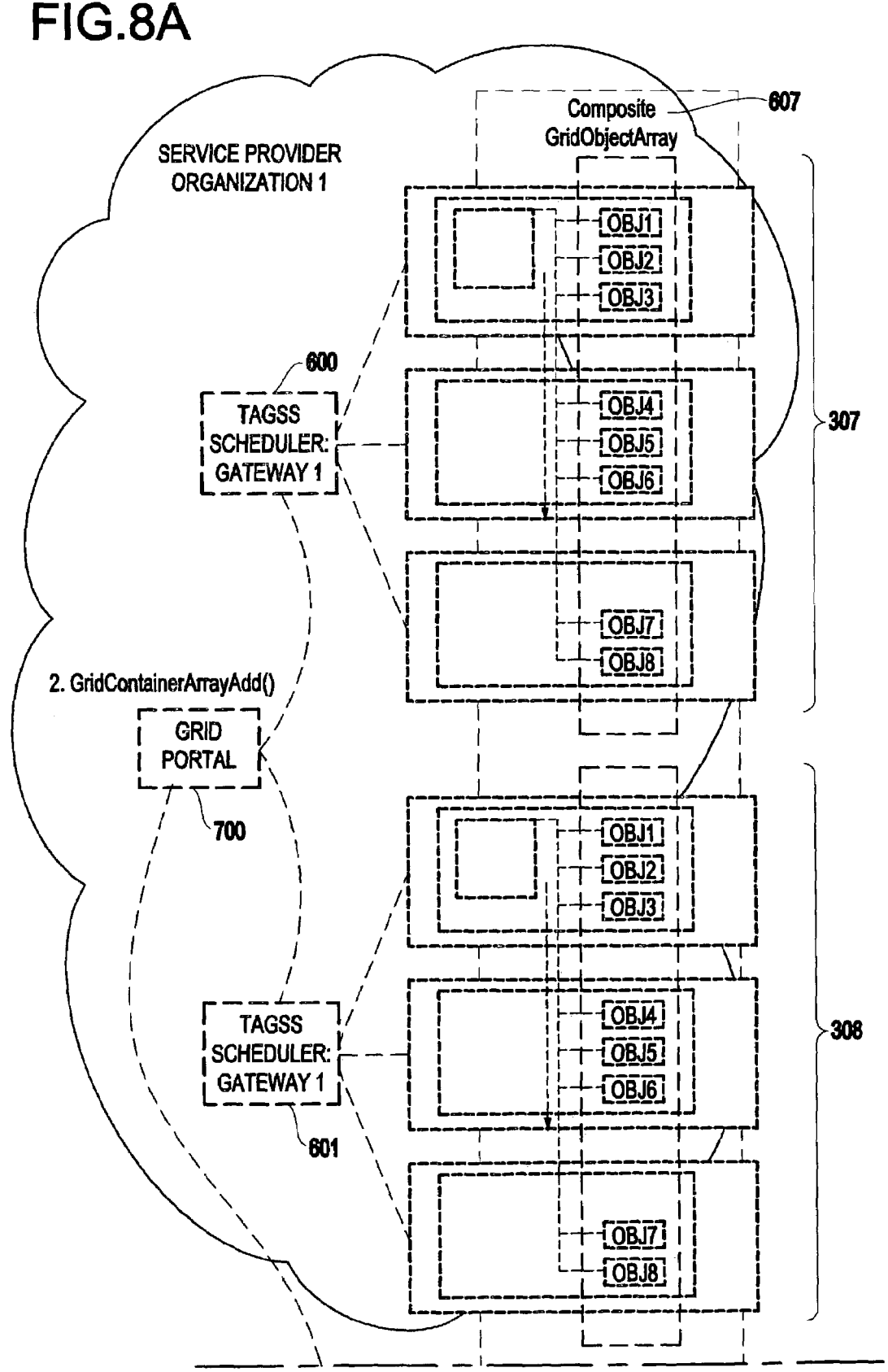
FIG. 8 is a schematic diagram illustrating the deployment of the invention in a grid.

FIG. 6A-6C shows the objects that are constructed using the code above in a sample multi cluster environment. Specifically, FIG. 6A illustrates the Grid object array 306 bound to the "gateway1" 600; FIG. 6B illustrates the Grid object away 306 bound to the "gateway2" 601; and, FIG. 6C illustrates the combination of FIGS. 6A and 6B. FIG. 7 includes a grid portal 700 to aid in communication efficiency between the gateways 600, 601. Specifically, FIG. 7A illustrates the Grid object array 607 bound to the "gateway1" 600; FIG. 7B illustrates the Grid object away 607 bound to the "gateway2" 601; and, FIG. 7C illustrates the combination of FIGS. 7A and 7B. It should be noted that the examples above introduce a 2-tier scheduling hierarchy. Multi-tier hierarchies that employ intermediate processes which act as a proxy to the Services Schedulers, and that build composite Grid Object Arrays are available with the invention. For example, FIG. 8 illustrates an outsourcing organization 800 that includes a grid portal, multiple client processes 215, 216, multiple schedulers 200, 201 are connected to other grid portals 700, 702 that access multiple grid container arrays 307-309. In the system shown in FIG. 8, the composite grid container away 307-309 and the composite grid object array 607 grow to include all objects and containers under the control of the outsourcing organization 800. Specifically, FIG. 8A illustrates a service provider organization 1; FIG. 8B illustrates an outsourcing organization and a service provider organization 2; and FIG. 8C illustrates the combination of FIGS. 8A and 8B.

The Grid portal is configured to harvest containers from several individual Minimal Services Domains. Also, because the Grid Portal is a transparent proxy to the Service Schedulers 200, 201, the invention can concatenate any number of Grid Portals, resulting in deep hierarchies. There are several possible configurations of how the TAGSS architecture is deployed in a Grid environment, and the above suggests one of the simplest configurations. To simplify the discussion, we consider two basic roles for an organization: it can be a service provider or a services outsourcer. Our basic configuration suggests that a Grid Portal be configured that regulates all the flow of inbound and outbound service requests. This possibilitates an infrastructure for auditing all requests. The Grid Portals of outsourcing organizations run under a specific Grid certificate, with which it acquires resources from the Grid Portals of service provider organizations.

In one embodiment, the TAGSS processes: the Service Schedulers 200, 201 and Grid Portals 700-702, are started and configured by system administrators. Another implementation starts these processes on behalf of a single client (user or organization) on demand. For example, in FIG. 8, an outsourcing organization can submit job requests (along with application code) to the outsourcing organizations which start the required Grid Portals and Service Schedulers. In this way, the outsourcing organization acquires resources even if the service provider organization does not have the TAGSS application installed. With that approach, a whole new set of TAGSS processes are created on behalf of a single client.

The TAGSS scheduler can be deployed in a Grid environment as described above using the Globus 2.0 toolkit. The Globus 2.0 toolkit is strongly influenced by the job based architecture initially described in this disclosure, and basically only supports the job submission model. But, as previously noted, the job submission model can start the TAGSS software processes as jobs. Only these "jobs" are "very long lived", and they in turn schedule tasks at the level of service requests in behalf of several clients.

In other words the invention provides a computer system for processing client requests. The system includes a grid services scheduler connected to grid container arrays. Each grid container array includes persistent containers (e.g., service containers), each of which resides in a different computer host, and a micro scheduler. Each container includes many objects. The objects within the containers that make up a single grid container array comprise a grid object array. The grid services scheduler transparently divides a client request into a plurality of tasks and assigns groups of the tasks to each microscheduler. Each of the microschedulers assigns individual tasks from a group of tasks received from the grid services scheduler to objects within their corresponding grid object array.

The system can include additional levels of scheduler hierarchy and include gateways, each connected to a different grid services scheduler. Portals are connected to the gateways, and the portals pass client requests along the gateways to the grid services schedulers.

Each container array resides in a local area network, such that communications between objects within a grid container array comprises local communications. The grid services schedulers divide the client request in a transparent manner such that a client is unaware of the dividing of the client request. The containers are persistent service containers and are used to process multiple client requests of multiple clients over a time period that spans multiple client requests.

The invention also provides a method of processing client requests over a computer network of hosts, that includes creating persistent containers in the hosts, creating objects in the containers, grouping the containers into grid container arrays, grouping objects within containers that are within a single grid container array into grid object arrays, creating one micro scheduler for each grid container array, dividing each of the client requests into a plurality of tasks, and assigning groups of the tasks to the microschedulers, wherein the microschedulers assign individual tasks to the objects. The invention assigns the microschedulers additional groups of tasks as the microschedulers return groups of completed tasks. The method can also include passing the client requests through gateways to multiple grid services schedulers.

Thus, the invention described above uses a grid services scheduler to divide a client request into many tasks. The system executes said tasks through multiple objects within a grid object array, the objects are within containers that make up a grid container array, and the grid container array is controlled by a micro scheduler.

The invention provides a Topology Aware Grid Services Scheduler (TAGSS), that is a new architecture for request level scheduling for grids. This architecture is topology aware because the task scheduling infrastructure is designed to operate in a diverse computing environment, comprised of computing hosts and networks of varying capabilities. Such a diverse computing environment is common in Grid computing, and it contrasts with the homogeneous environment usually found in Cluster computing. Consequently, the scheduling techniques used in Cluster computing are not adequate for Grid computing. Another important characteristic of TAGSS is that it is based on a services oriented architecture. This is a sharp contrast with traditional Cluster scheduling, because Cluster schedulers are based on a job oriented architecture. The recent introduction of the Open Grid Services Architecture (OGSA) brings a service based architecture to the world of Grid computing, and also brings with it new challenges related to the task of scheduling services requests in a Grid. This disclosure above discusses these challenges, and relates them to the features in the TAGSS architecture.

While the invention has been described in terms of preferred embodiments, those skilled in the art will recognize that the invention can be practiced with modification within the spirit and scope of the appended claims.

What is claimed is:

1. A method of processing client requests over a computer network of hosts, said method comprising:

creating persistent containers in said hosts;

creating objects in said containers;

grouping said containers into grid container arrays, wherein each grid container array resides in a local area network, such that communications between objects within each said grid container away comprises local communications;

grouping objects within containers that are within a single grid container array into grid object arrays;

creating one micro scheduler for each grid container array;

dividing each of said requests into a plurality of tasks;

assigning groups of said tasks to said microschedulers, wherein said microschedulers assign individual tasks to said objects, and wherein said containers comprise service containers and are used to process multiple client requests of multiple clients over a time period that spans multiple client requests.

2. The method in claim 1, all the limitations of which are incorporated herein by reference, further comprising assigning said microschedulers additional groups of tasks as said microschedulers return groups of completed tasks.

3. The method in claim 1, all the limitations of which are incorporated herein by reference, further comprising passing said client requests through gateways to a plurality of grid services schedulers.

4. The method in claim 1, all the limitations of which are incorporated herein by reference, wherein said dividing is performed in a transparent manner such that a client is unaware of the dividing of said client request.

5. A method of processing client requests over a computer network of hosts, said method comprising:
   creating persistent containers in said hosts;
   creating objects in said containers;
   grouping said containers into grid container arrays, wherein each grid container array resides in a local area network, such that communications between objects within each said grid container array comprises local communications;
   grouping objects within containers that are within a single grid container array into grid object arrays;
   creating one micro scheduler for each grid container array;
   topologically positioning said micro scheduler in a container that has the highest performance of all containers in said grid container array;
   dividing each of said requests into a plurality of tasks;
   assigning groups of said tasks to said microschedulers, wherein said microschedulers assign individual tasks to said objects, and
   wherein said containers comprise persistent service containers and are used to process multiple client requests of multiple clients over a time period that spans multiple client requests.

6. The method in claim 5, all the limitations of which are incorporated herein by reference, further comprising assigning said microschedulers additional groups of tasks as said microschedulers return groups of completed tasks.

7. The method in claim 5, all the limitations of which are incorporated herein by reference, further comprising passing said client requests through gateways to a plurality of grid services schedulers.

8. The method in claim 5, all the limitations of which are incorporated herein by reference, wherein said dividing is performed in a transparent manner such that a client is unaware of the dividing of said client request.

* * * * *